April 28, 1936.     J. A. WAGNER     2,038,618
METHOD AND APPARATUS FOR PRODUCING CONTAINERS
Filed May 23, 1931     2 Sheets-Sheet 1
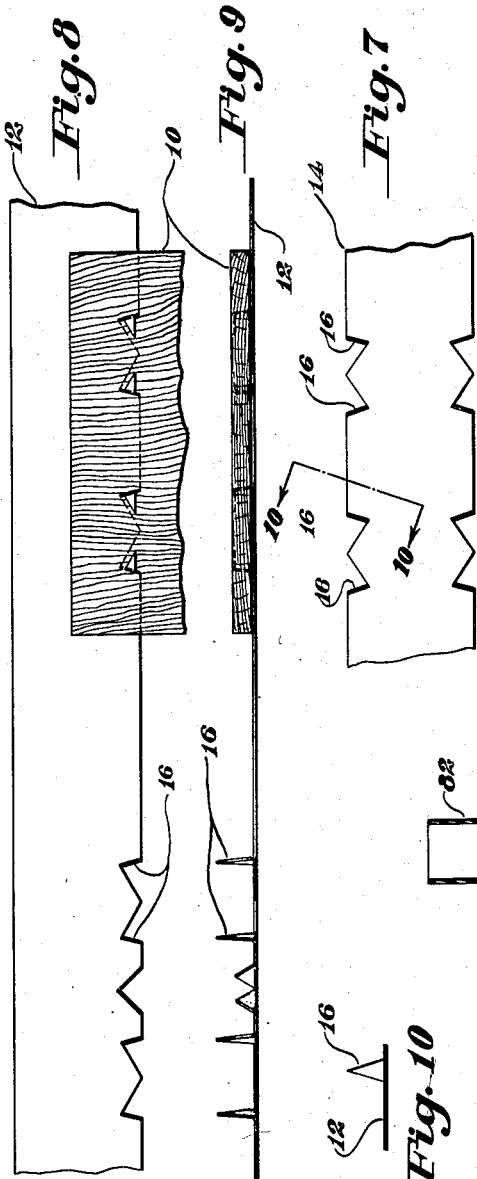
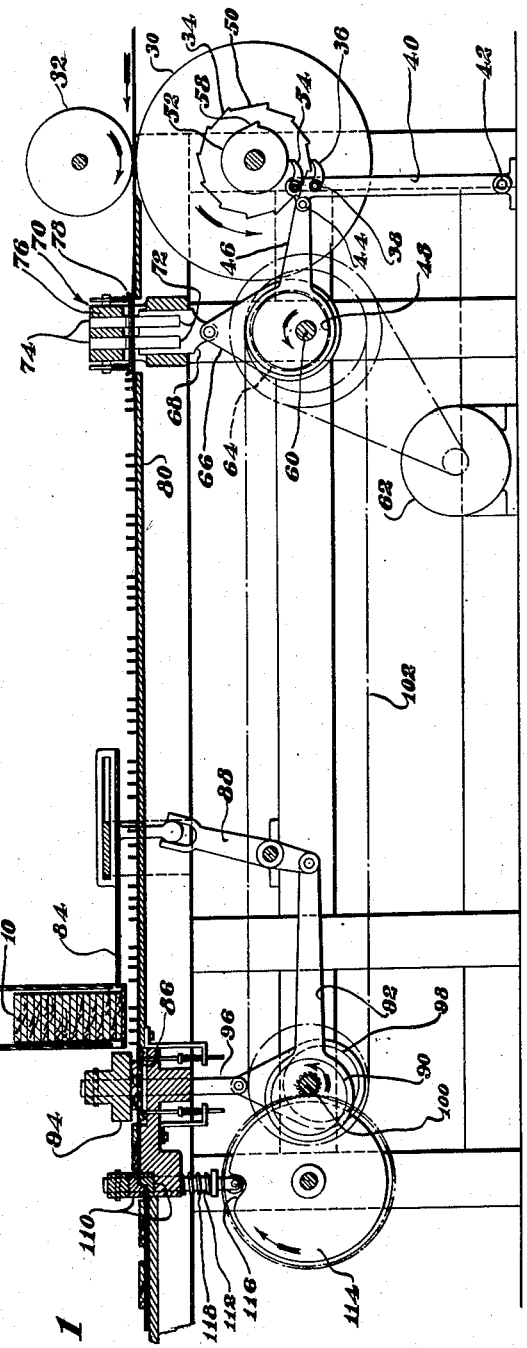

April 28, 1936. J. A. WAGNER 2,038,618
METHOD AND APPARATUS FOR PRODUCING CONTAINERS
Filed May 23, 1931 2 Sheets-Sheet 2
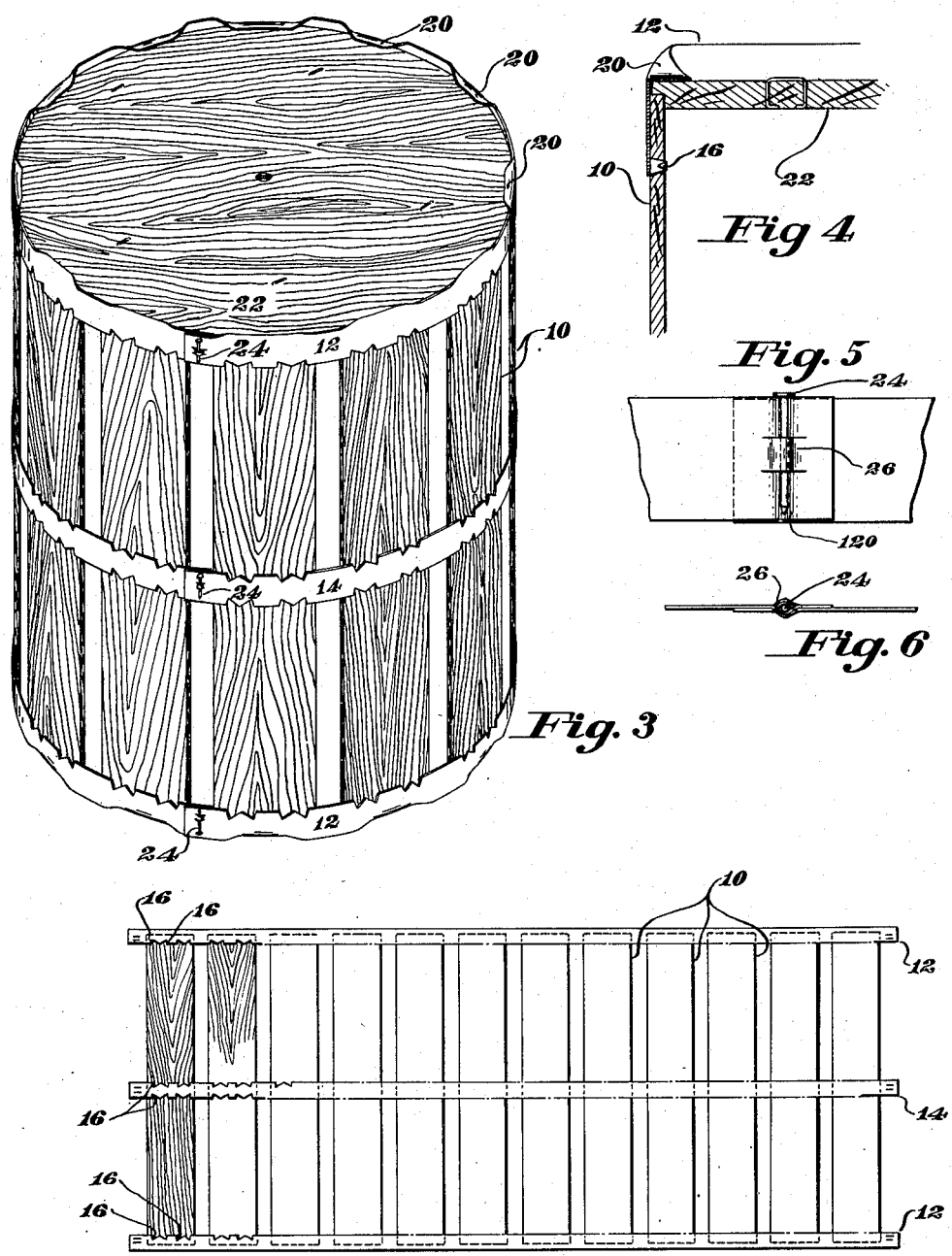

Patented Apr. 28, 1936

2,038,618

UNITED STATES PATENT OFFICE 2,038,618

METHOD AND APPARATUS FOR PRODUCING CONTAINERS

John A. Wagner, St. Petersburg, Fla., assignor to George M. Leghorn, Winchester, Mass.

Application May 23, 1931, Serial No. 539,619

12 Claims. (Cl. 1—12)

The present invention relates to methods and apparatus for the production of containers suitable for the shipment of oranges, grapefruit, lemons, apples and similar commodities.

The purpose of the invention is to devise a simple and effective method of producing containers which enables them to be partially fabricated, shipped to the fruit packer in a knocked-down condition, and thereafter simply and easily erected during packing. A further object of the invention is to produce such a container in a simple and economical manner, which permits discarding of the container after it has served its usefulness.

With this and other objects in view, one feature of the invention contemplates the production of predetermined lengths of slatted material, each length being sufficient to form the complete periphery of a substantially cylindrical container of proper dimensions. In actual assembly each slatted length is combined with two circular disk heads, the heads being locked to the peripheral slatted portion of the container by any simple instrumentality such as a hammer.

A further feature of the invention contemplates the provision of apparatus for automatically assembling and delivering a series of slats with a predetermined spacing connected through the employment of lengthwise metallic bands, which serve as reinforcing and connecting hoops when the slatted length is bent into circular form. The apparatus automatically handles the metallic bands in endless lengths, forms projecting tongues or tangs thereon in the proper location, assembles slats in spaced relation upon the bands, and clinches the projecting tangs within the slats automatically. At the completion of a predetermined length of slatting, the bands are severed and properly formed to provide interlocking eyes for the introduction of a locking instrumentality when the container is assembled.

Referring to the accompanying drawings, Fig. 1 represents a side elevation, partly in section, of one form of the apparatus designed for the automatic production of the spaced slats; Fig. 2 illustrates a length of slatting as delivered from the apparatus; Fig. 3 is the completed container in elevation; Fig. 4 is a detail illustrating the method of locking the heads to the circular slatting; Fig. 5 is a detail illustrating the method of securing the ends of the slatting together; Fig. 6 is a detail showing an elevation of the securing eyes; Fig. 7 is a detail illustrating the tongues formed in the steel bands; Figs. 8 and 9 are a plan and elevation, respectively, showing the manner in which the tongues are clinched into the spaced wooden slats; and Fig. 10 is a detail illustrating a section through the band, showing one of the locking tongues.

In the method illustrated in the drawings and as shown more particularly in Fig. 2, a predetermined length of slatting is delivered from the machine, this slatting comprising thin wooden slats 10 connected to two outer bands 12, and an intermediate band 14 arranged in parallel relation. The slats are clinched to the outer bands through tongues 16 formed on the inner edges thereof, and to the intermediate band through similar tongues 16 formed on opposite edges thereof, the tongues being clinched within the material of the slats, as indicated more particularly in Figs. 8 and 9. From an inspection of Fig. 2 it will be evident that the outer bands are disposed in such a manner that they project beyond the ends of the slats, leaving an extended portion of the band which may be turned over at intervals, as indicated in Fig. 4, to form locking portions 20, which serve to lock the heads 22 in assembled relation to the predetermined length of slatting.

As will be evident to those skilled in the art, in assembly a length of slatting and two heads are first taken, one head is assembled with the slatting extending thereabout and locked thereto through the portions 20, the opposite free ends of the slatting being connected by the insertion of pins or nails 24 through the complementary eyes 26. Thereafter the container is filled, the complementary head 22 inserted in place and locked therein by the inturned portions 20 of the upper hoop.

The apparatus for automatically producing the slatting is designed to intermittently feed the required number of bands in parallel relationship, and to pass these bands between forming dies which serve to cut and form the locking tongues 16 at required intervals. Thereafter the formed bands are intermittently traversed lengthwise of the machine into position to receive a transverse slat. During the period between advancing motions, the transverse slat is pressed on to the tongues, and the latter clinched in position, all in one operation prior to the next feeding movement. At the completion of a predetermined length of slatting, the bands are severed automatically with the eyes formed therein, and a predetermined length of slatting delivered from the machine.

The apparatus illustrated in Fig. 1 comprises essentially a lower feed drum 30 and an upper presser member 32, which engage between them one or more bands, as desired, and intermittently advance these bands lengthwise of the apparatus. The bands may be guided and maintained in parallel spaced relation by any suitable form of guiding mechanism (not shown) either on the drums themselves or engaging the bands prior thereto.

The upper presser member 32 is loosely revoluble, and the lower member is intermittently rotated by a ratchet 34 engaged intermittently by a driving pawl 36, pivotally mounted at 38 upon an arm 40, pivotally supported at 42. The upper free end of the arm is connected at 44 with an operating arm 46, operated by an eccentric 48. Continuous rotation of the eccentric through the provision of the operating arm 46 oscillates the pawl 36 and causes an intermittent advance of the ratchet and connected feed drum 30 in the direction of the arrow. The pawl may be maintained in engagement with the ratchet through the usual type of spring (not shown).

It will be observed from an inspection of the drawings that the ratchet 34 is provided with one tooth 50 which is somewhat longer than the remaining teeth, this tooth being of sufficient length to avoid advancing of the ratchet by the pawl at this point. Mounted on the shaft of the ratchet 34 is a single toothed ratchet 52, operatively engaged by a pawl 54 mounted on the arm 40 above the pawl 36. The pawl 54 is adapted to engage the tooth 58 of the ratchet 52 when the tooth 50 is normally encountered by the pawl 36, and through engagement with the tooth 58 cause advancing movement of the feed drum. This advancing movement is somewhat greater in extent, as determined by the additional length of the ratchet tooth 50, and serves to impart the necessary additional increment of movement for giving increased length at the end of the band where it is severed and the coupling eyes formed, all as will be described more fully hereinafter.

The eccentric 48 is mounted upon a shaft 60, operated from a motor 62, and carrying in addition a second eccentric 64, which operates punching and forming dies indicated generally at 70 through an eccentric strap 66 and a sliding die head 68. This head in the illustrated embodiment of the invention carries a pair of dies 72 which cooperate with complementary dies 74 mounted in a stationary head 76 to simultaneously form two sets of tongues, as indicated in Fig. 7. Obviously, the punching and forming dies are repeated transversely of the apparatus to simultaneously punch and form locking tongues in as many bands as may be employed, all of these dies operating simultaneously. Co-operating with each set of dies is a spring-pressed stripper plate 78, which frees the band from the upper dies after withdrawal of the lower movable dies. After formation of the locking tongues, the bands are advanced along the surface of a table 80 to position the bands for the formation of the next succeeding set of tongues.

At the opposite end of the machine the punched and formed bands are assembled with the wooden cross-slats 10, which are automatically delivered to a position above the bands and clinched thereto. To this end a slat hopper 82 is mounted above the table, and the slats are delivered therefrom individually by a feed slide 84, which engages the lowermost slat and advances it into position above the spring-pressed platen or platens 86, which are slightly elevated from the position shown in the drawings to support the slat initially above the projecting tongues of the bands. This feed slide is operated from a rocker lever 88, connected with an eccentric 90 through an arm 92, and serves to intermittently eject and deliver the slats singly to position on the platens in advance of the operation of clinching the slats to the tongues. This later operation is accomplished through a movable anvil 94, which is depressed into engagement with the previously assembled slat, forcing the slat downwardly on the tongues and clinching the tongues in the material of the slat itself, in this operation the platens 86 being depressed to the position shown in Fig. 1. The anvil is operated through arms 96 connected with an eccentric 98, the timing of this being such that the operation of the platen and the clinching of the slats takes place when the bands are at rest between advancing movements, or practically simultaneously with the formation of the tongues in the slats. The shaft 100, carrying the eccentrics 90 and 98, may be operated from a sprocket chain 102, engaging at opposite ends with sprockets on the shafts 100 and 60.

After the formation of a predetermined length of slatting which, in the present instance is a length sufficient to embrace twelve cross-slats, the longitudinal bands are automatically severed, complementary eyes formed in adjacent ends, and delivered to the machine. For the severing of the bands and formation of the eyes, complementary cutting dies 110 are employed. In this pair of dies the upper one is caused to move through an actuating member 112, engaged by a cam 114, which makes one revolution for each twelve of the feed in proper gear ratios. This cam has a single depression 116, which once in each revolution causes actuation of the cutting dies through the spring 118. This operation is properly timed with the increased increment of advancing movement, so that the severing of the bands and formation of the complementary eyes takes place in the region of greatest advance where the increased separation of the slats permits this operation to be carried out.

As indicated more particularly in Figs 5 and 6, the bands are provided with fastener-receiving recesses 120 adjacent their ends and slitted to form a transverse eye 26, the two eyes registering to permit the insertion therethrough of a securing instrumentality 24 when the ends of the bands are caused to overlap during assembly of the container.

The important and desirable aspect of the present invention concerns the type of locking tongue which is formed upon the bands, as the formation of this tongue determines to a considerable extent the practicability of properly clinching the slats to the bands. In this connection it has been found that by forming the tongues, as indicated more particularly in Figs. 7 to 10, in such a fashion that the opposite inclined sides of the triangular tongue are of equal length and inclination, the tongue is caused to radially penetrate the material of the slat without undue tendency to bend or to fracture the slat during assembly. Unless the tongues are properly formed they merely bend over during pressure of the slat thereon, without entering the material of the slat and permitting proper clinching therein. It will be noted from an inspection of the figures referred to that the base of the tongues is disposed at an angle with relation to the length of the band, and that the opposite sides of the tongues are of equal length, thus providing an ideal form of locking tongue which enters the wooden slat with a minimum probability of splitting or fracturing the slat along the grain. It will furthermore be noted from an inspection of Fig. 2 showing the completed slatting that each of the outer bands is provided with tongues only along its inner edge, whereas the intermediate band is provided with locking tongues on both sides. This method of construction is instrumental in obtaining the necessary rigidity and permanent assembly of the slats with the bands, at the same time permitting the projecting edges of the bands to be manipulated in any desired manner for the purpose of locking the heads to the peripheral slatted portion of the container.

Although it is perfectly obvious that a container made in this fashion can, if so desired, be readily adapted for re-use, nevertheless it is not the present intention to so employ it.

Although the present invention is concerned with the formation of tongues and the application of slats to previously punched bands singly, nevertheless it will be obvious that if so desired this operation could, without exercise of invention, be duplicated or repeated in any desired number, and performed simultaneously.

What is claimed is:

1. Apparatus for the production of slatting comprising means for intermittently advancing a series of metallic bands having provision for imparting an increased increment of feeding movement to the bands for each predetermined number of feeding movements of shorter length, means for successively applying cross-slats to the bands, means for forming projecting tongues in the bands prior to the application of the cross-slats, and means for severing the bands and forming eyes therein in the region of increased feeding movement after the cross-slats have been applied.

2. The method of forming a length of slatting for use in containers which consists in advancing one or more strips of metallic band, periodically forming by a single operation one or more sets of upstanding paired locking tongues in at least one of said strips during the advance thereof, assembling and securing cross-slats to the strips at spaced intervals by forcing said slats against one or more complete sets of the projecting tongues in timed relation with the formation of other locking tongues, and finally severing the strips between sets of tongues after a predetermined number of cross-slats have been secured thereto.

3. The method of forming a length of slatting for use in containers which consists in advancing a plurality of metallic bands, successively forming by a single operation one or more sets of upstanding locking tongues in at least one of the bands at spaced and predetermined intervals during the advance thereof, assembling and securing cross-slats thereto by forcing each slat against one or more complete sets of the tongues, increasing the advancing movement of the bands after a predetermined number of cross-slats have been attached, and severing the bands within the region where the movement has been increased.

4. Apparatus for the production of slatting comprising means for guiding a series of straight parallel metallic bands, a reciprocating punch for striking upstanding tongues from each band, a reciprocating press for applying and securing individual slats to the tongues, and a feeding means acting on the bands before the slats are attached to cause them to advance equally through the punch and the press.

5. Apparatus for the production of slatting comprising means for advancing a series of parallel metallic bands, a reciprocating punch for striking one or more sets of upstanding locking tongues from each band at a single stroke, a reciprocating press for applying and securing cross slats uniformly to said one or more sets of locking tongues, a hopper, means for delivering individual slats from the hopper directly to the press, and operating connections to cause the punch and the press to operate simultaneously and the delivering means to act between operations of the punch and press.

6. Apparatus for the production of slatting comprising means for advancing a series of parallel metallic bands having laterally projecting tongues, a reciprocating press anvil for applying and securing cross-slats to said tongues, a spring pressed platen resiliently acting against the press anvil, a hopper, means for ejecting individual slats from the hopper and interposing them between the platen and the press anvil preparatory to application to the metallic bands, and operating connections for actuating the press anvil alternately with the ejecting means to apply the ejected slats to the bands.

7. Apparatus for the production of slatting comprising means for advancing a series of parallel metallic bands, a punch for striking one or more sets of upstanding locking tongues from each band at each operation after passing the advancing means, a press for applying and securing individual cross slats uniformly to said one or more complete sets of locking tongues, a hopper and means for delivering individual slats from the hopper directly to the press in timed relation to the operation of the press.

8. Apparatus for the production of slatting comprising means for advancing a series of parallel metallic bands, a punch for striking one or more sets of upstanding locking tongues from each band at each operation, an eccentric shaft, a press operated from the eccentric shaft for applying and compressing individual cross slats uniformly against said one or more complete sets of locking tongues on the bands, a hopper, and a reciprocating feed slide operated from said eccentric shaft for delivering individual slats from the hopper directly to the press while the bands are released from the press.

9. A machine for manufacturing box blanks from metal bands and slats, which comprises means for intermittently moving the bands through the machine, means for forming spaced projections on the bands while the latter are at rest, and means for rendering the aforesaid means operative to space the projections a greater distance at regular intervals.

10. A machine for manufacturing box blanks from slats and bands, comprising means for intermittently moving the bands through the machine, means for forming projections on the bands while the latter are at rest, means for feeding slats to the bands in spaced relation, means for increasing the space between certain slats, and means for forming holding means on the band portions in such larger space.

11. A machine for manufacturing box blanks from slats and metal binding members, comprising means for moving the binding members through the machine, means for fastening slats to the binder members, and means for intermittently moving the assembled slats and binder members through the machine and for automatically moving the assembly a greater amount at predetermined intervals.

12. Apparatus for the production of slatting comprising a table, means acting at one position on the table to advance a series of metallic bands in parallel relation, means for automatically delivering cross-slats at spaced intervals to the bands at a position beyond that at which the advancing means acts, means for forming upstanding locking tongues in the bands between the advancing movements, means for applying delivered cross-slats to the tongues between advancing movements, and means for severing the bands between advancing movements after a predetermined number of slats have been applied.

JOHN A. WAGNER.